(12) United States Patent
Mokhtari et al.

(10) Patent No.: US 9,105,373 B2
(45) Date of Patent: Aug. 11, 2015

(54) SAFE METHOD FOR MANUFACTURING SILVER NANOPARTICLE INKS

(71) Applicant: XEROX CORPORATION, Norwalk, CT (US)

(72) Inventors: Mahya Mokhtari, Etobicoke (CA); Tila Tahmoures-Zadeh, Thornhill (CA); Roger E. Gaynor, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 13/921,785

(22) Filed: Jun. 19, 2013

(65) Prior Publication Data

US 2014/0374670 A1   Dec. 25, 2014

(51) Int. Cl.
*H01B 1/22* (2006.01)
*C09D 11/52* (2014.01)

(52) U.S. Cl.
CPC . *H01B 1/22* (2013.01); *C09D 11/52* (2013.01)

(58) Field of Classification Search
CPC .............. H01B 1/22; G03F 5/00; B22F 9/18; B22F 9/24; B32B 3/10; B32B 5/15; H05K 3/12; H01L 21/84
USPC ........... 438/149; 427/256, 553; 428/402, 207; 75/370; 430/58.05; 252/514
See application file for complete search history.

(56) References Cited

U.S. PATENT DOCUMENTS

| 8,158,032 B2* | 4/2012 | Liu et al. .................. 252/514 |
| 2007/0099357 A1* | 5/2007 | Li et al. .................. 438/149 |
| 2007/0281136 A1* | 12/2007 | Hampden-Smith et al. .................. 428/195.1 |
| 2009/0148600 A1 | 6/2009 | Li et al. |
| 2009/0181183 A1 | 7/2009 | Li et al. |

OTHER PUBLICATIONS

Holder et al. "Toxicity of Silver Nanoparticles at the Air-Liquid Interface". BioMed Research International. 12 total pages.*

* cited by examiner

*Primary Examiner* — Mark Kopec
*Assistant Examiner* — Danny N Kang
(74) *Attorney, Agent, or Firm* — MH2 Technology Law Group LLP (57) ABSTRACT

In an embodiment, there is a method of preparing a conductive ink formulation. The method can include dissolving a stabilizer in a first solvent, adding a reducing agent to the first solvent, adding a metal salt to the first solvent and forming a slurry by precipitating stabilized metal nanoparticles in the first solvent. The method can also include forming a wet cake of the stabilized metal nanoparticles and adding the wet cake to a second solvent. The second solvent can include at least one of a polyvinyl alcohol derivative. The wet cake may not be actively dried prior to being added to the second solvent.

20 Claims, 3 Drawing Sheets

SAFE METHOD FOR MANUFACTURING SILVER NANOPARTICLE INKS

TECHNICAL FIELD

Embodiments relate generally to the field of printed electronics materials, particularly conductive inks, and specifically to the field of methods of manufacturing conductive inks that contain nanoparticles.

BACKGROUND

Fabrication of electronic circuit elements using liquid deposition techniques is of profound interest as such techniques provide potentially low-cost alternatives to conventional mainstream amorphous silicon technologies for electronic applications such as thin film transistors (TFTs), light-emitting diodes (LEDs), RFID tags, photovoltaics, and the like. However the deposition and/or patterning of functional electrodes, pixel pads, and conductive traces, lines and tracks, which meet the conductivity, processing, and cost requirements for practical applications have been a great challenge.

Solution-processable conductors are of great interest for use in such electronic applications. Silver nanoparticle-based inks represent a promising class of materials for printed electronics. For example, silver nanoparticles have unique optical, electrical, and thermal properties and can be incorporated into products that range from photovoltaics to biological and chemical sensors. Furthermore, conductive inks, pastes and fillers can utilize silver nanoparticles for their high electrical conductivity, stability, and low sintering temperatures.

However, most silver (and gold) nanoparticles often require large molecular weight stabilizers to ensure proper solubility and stability in solution. These large molecular weight stabilizers inevitably raise the annealing temperatures of the silver nanoparticles above 200° C. in order to burn off the stabilizers, which temperatures are incompatible with most low-cost plastic substrates such as polyethylene terephthalate (PET) and polyethylene naphthalate (PEN) that the solution may be coated onto and can cause damage thereto.

Furthermore, current silver nanoparticle compositions may have adhesion issues with some substrates. Simply rubbing and/or contacting the surface of the printed silver features may thus inevitably damage the printed features from such silver nanoparticle compositions. Thus, the poor adhesion of the silver nanoparticle composition may limit its use in certain applications, such as, for example, printed antennas.

Figure 1:
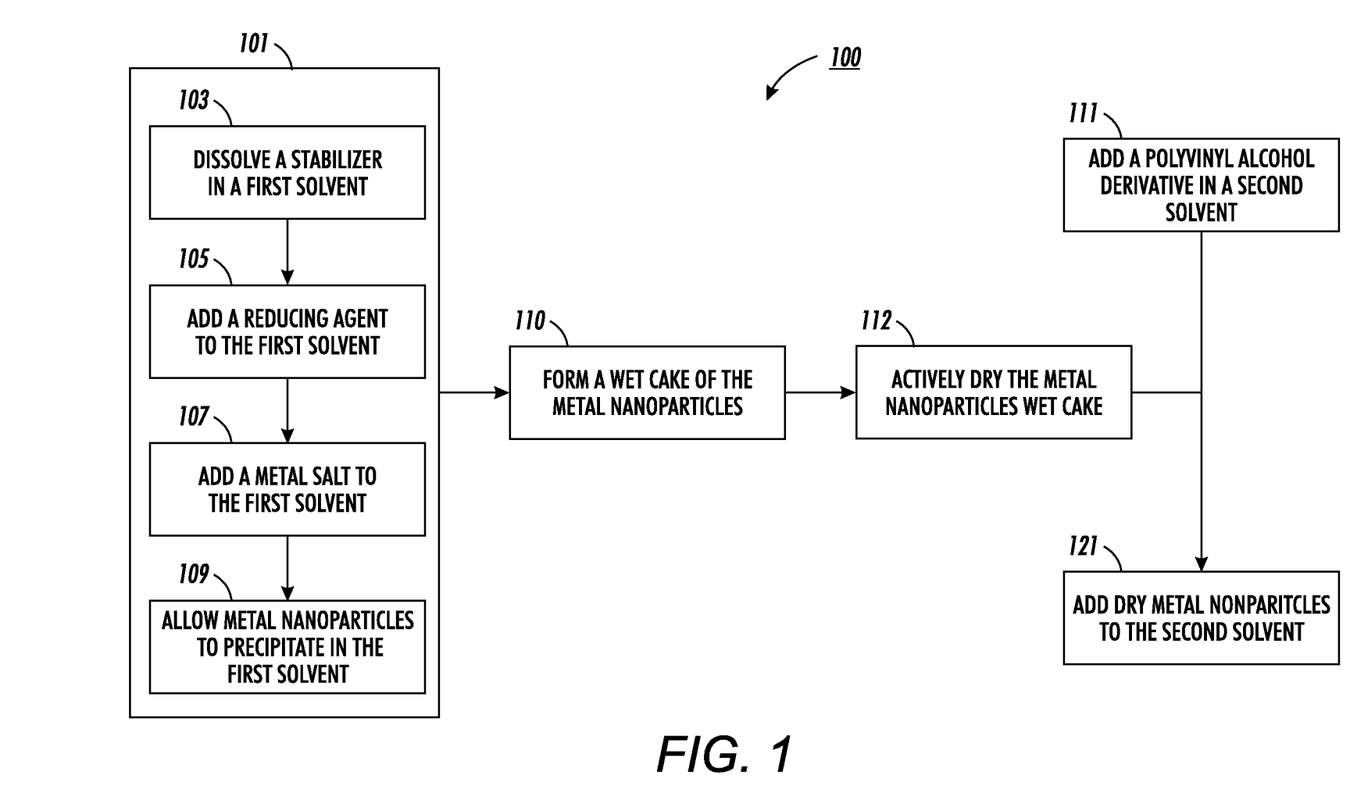
FIG. 1 is a flow chart illustrating a process of forming a nanoparticles-based ink from actively dried nanoparticles.

Additionally, nanoparticles can require special handling during processing. For example, in a conventional method 100 for preparing nanoparticles-based inks as shown in FIG. 1, dried silver nanoparticles, such as nanoparticles stored in powder form are utilized. The nanoparticles can be formed by a method 101. According to method 101, a stabilizer can be dissolved in a first solvent 103, a reducing agent can be added the first solvent 105, a metal salt can be added to the first solvent 107, and the stabilized metal nanoparticles can form, such as by precipitation, in the first solvent 109 to form a slurry of metal nanoparticles. The metal nanoparticles can then be formed into a wet cake 110, such as by filtering the slurry then actively dried 112, such as by vacuum drying, air drying or the like. The dried silver nanoparticle powder can be weighed out in a fume-hood. Meanwhile, a polyvinyl alcohol derivative can be added 111 with a second solvent. The dry nanoparticles can then be added 121 with the second solvent. For example, the powder can be added to decalin and mixed for a period of time to be fully dispersed. Appropriate mixtures are determined by the quality of dispersion therein as verified by predetermined surface roughness and conductivities, as well as, predetermined silver content in the dispersed phase by ash technique.

Occupational exposure limits are well known for larger particles of similar chemical composition but exposure limits for airborne exposure to engineered silver nanoparticles have not been readily established. Published work in nanotoxicology describes studies related to high concentration of silver nanoparticles in rats or different microorganisms which could be difficult to translate to a realistic human chronic exposure scenario. The human risk associated with workplace air concentrations of silver nanoparticles and their release mechanisms and concentrations is still unknown.

In addition to the lack of identified exposure limits for materials such as silver nanoparticles, for example, those having average particle size of <10 nm, properly designed personal protection equipment (masks, etc.) to prevent exposure is not readily available. Accordingly, handling such small particles, especially during the manufacture of large quantities of inks using dried nanoparticles is challenging and must be presumed to be unsafe.

There is, therefore, a need for a safer method of manufacturing inks that overcomes the challenges of current manufacturing processes that utilize dried nanoparticles.

SUMMARY

In an embodiment, there is a method of preparing a conductive ink formulation. The method can include dissolving a stabilizer in a first solvent, adding a reducing agent to the first solvent, adding a metal salt to the first solvent and forming a slurry by precipitating stabilized metal nanoparticles in the first solvent. The method can also include forming a wet cake of the stabilized metal nanoparticles and adding the wet cake to a second solvent. The second solvent can include at least one of a polyvinyl alcohol derivative. The wet cake may not be actively dried prior to being added to the second solvent.

In an embodiment there is a method of preparing a conductive ink formulation. The method can include reacting a metal salt with a reducing agent in a first solvent that contains a stabilizer to form a stabilized metal nanoparticle slurry. The method can also include forming a wet cake of stabilized metal nanoparticles from at least a portion of the stabilized metal nanoparticle slurry. The method can also include adding the wet cake to a second solvent that contains a polyvinyl alcohol derivative.

Advantages of at least one embodiment include minimized exposure to nanoparticles in preparing nanoparticles-based inks. An advantage of at least one embodiment includes formation of a wet cake of nanoparticles that decreases the health hazards of dry nanoparticles. For example, an advantage of at least one embodiment includes reduction in the volatiles emitted while handling the silver nanoparticles, which can be harmful to humans.

Additional advantages of the embodiments will be set forth in part in the description which follows, and in part will be understood from the description, or may be learned by practice of the disclosed embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Described herein is an ink composition containing stabilized silver nanoparticles and exhibiting improved adhesion to the surface of a substrate. The ink composition is comprised of a silver nanoparticle solution that may contain silver nanoparticles, a stabilizer and a solvent. The ink composition may also contain a polyvinyl resin such as a polyvinyl butyral (PVB) resin. After the ink composition is printed onto a substrate, the substrate is annealed to form conductive silver features on the substrate.

Embodiments described herein include a method of making conductive inks from a wet cake of metal nanoparticles, wherein the wet cake is not actively dried. As used herein, the phrase, "wet cake" refers to a composition, such as stabilized metal nanoparticles, for example, organoamine stabilized silver nanoparticles, that have been substantially removed from a slurry but have not been actively dried after their synthesis. As used herein, the phrase, "active drying" or "actively dried" refers to substantially isolating metal nanoparticles from solvent, such as by air-drying, vacuum drying, or the like so as to allow the nanoparticles to settle as a powder. Thus, a wet cake of silver nanoparticles can include nanoparticles formed by methods described in US Patent Application Publication No. 20100143591, U.S. Pat. No. 8,158,032, and U.S. patent application Ser. No. 13/866,704 filed on Apr. 19, 2013, the contents of which are incorporated by reference herein in their entireties except that the nanoparticles described herein are not actively dried after they are formed and before they are incorporated into a resin-containing solvent (such as that with a polyvinyl alcohol derivative resin) when forming an ink therefrom. Active drying does not include methods of removing precipitate from a solvent such as removing precipitated metal nanoparticles from a solvent in which they are formed by filtering. Active drying does not include methods in which some residual volatiles that may otherwise lead to ink stability issues are removed from the surface of the nanoparticles. Accordingly, wet cakes described herein can contain a volatile content of from about 8 wt % to about 25 wt % of volatiles, for example from about 10 wt % to about 17 wt % of volatiles, or for example from about 13 wt % to about 15 wt % of volatiles, such as of solvent, for example first solvent. Thus, embodiments described herein can minimize, if not completely eliminate, the handling of dried, dusty silver nanoparticles during ink manufacturing. Accordingly, methods described herein eliminate the need to handle materials containing very-small particles, and avoid the creation of and exposure to dusty conditions, and thereby provide for the safety of the operator in, for example, processing facilities.

Method of Making Metal Nanoparticle-Based Conductive Ink

Embodiments described herein can utilize metal nanoparticles that have not been stored as a powder in a process for forming nanoparticle-based inks. Instead, the nanoparticles can be stored as a wet cake. In such a process, after the nanoparticles are formed, they are not actively dried before being introduced into a resin-containing solvent. In general, volatile content in the wet cake can be measured after each synthesis. Based on the measured volatile content, an appropriate mass of silver nanoparticle wet cake can be determined from which, for example, an ink containing from about 30 wt % to about 40 wt % silver content can then be formed. This amount of wet cake of silver nanoparticles can be pre-soaked, for example overnight, in decalin under gentle nitrogen purge (1-2 SCFH), to remove residual volatiles from the surface of these materials which would potentially cause ink stability challenges. Silver nanoparticles are then dispersed into decalin by milling or mixing and are filtered to obtain an ink product.

Figure 2:
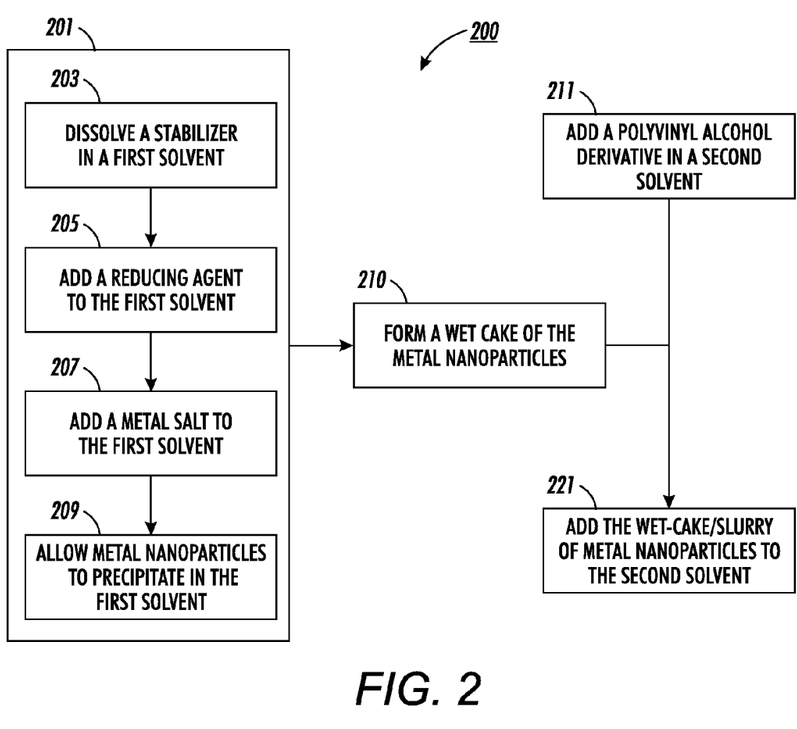
FIG. 2 is a flow chart illustrating a process of forming a nanoparticles-based ink from a wet cake of nanoparticles formed by a first method in which the wet cake of nanoparticles is not actively dried.

Shown in FIG. 2 is a method 200 for forming nanoparticle-based ink. A wet cake/slurry of stabilized metal nanoparticles can be formed 201 by dissolving 203 a stabilizer in a first solvent, adding 205 a reducing agent to the first solvent before adding 207 a metal salt to the first solvent, and allowing the stabilized metal nanoparticles to precipitate 209 in the first solvent to form a slurry. A wet cake of the precipitated, stabilized metal nanoparticles is then formed 210, for example, by filtering away at least a portion of the solvent. Meanwhile at least one of a polyvinyl alcohol derivative is added 211 with a second solvent. The wet cake comprising the stabilized metal nanoparticles is not actively dried prior to being added 121 with the second solvent containing the polyvinyl alcohol derivative.

Figure 3:
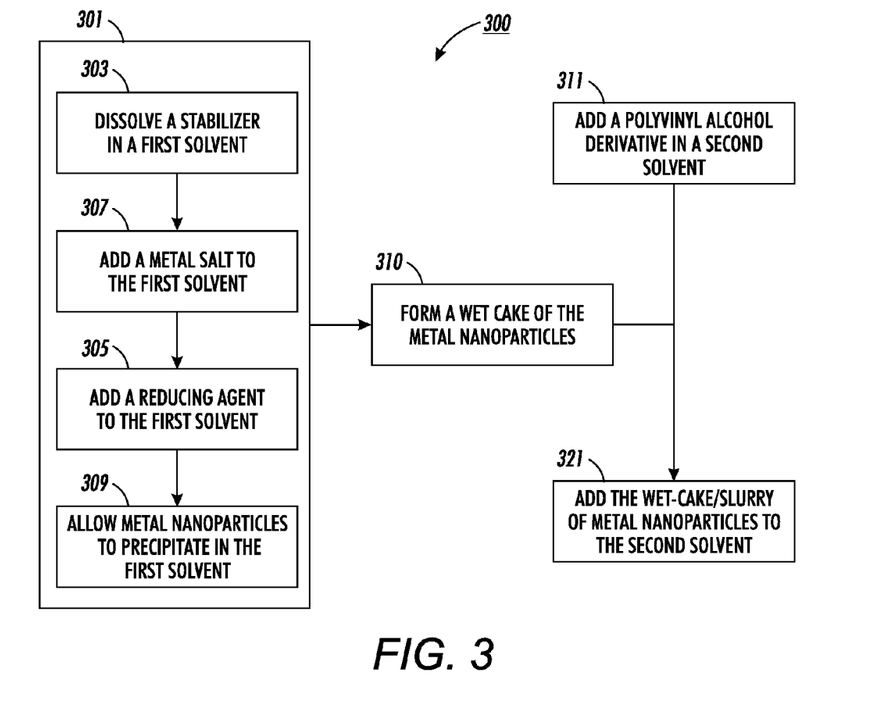
FIG. 3 is a flow chart illustrating another process of forming a nanoparticles-based ink from a wet cake of nanoparticles formed by a second method in which the wet cake of nanoparticles is not actively dried.

Shown in FIG. 3 is another method 300 for forming nanoparticle-based ink. A wet cake/slurry of stabilized metal nanoparticles can be formed 301 by dissolving 303 a stabilizer in a first solvent, adding 307 a metal salt to the first solvent before adding 305 a reducing agent to the first solvent, and allowing the stabilized metal nanoparticles to precipitate 309 in the first solvent to form a slurry. A wet cake of the precipitated, stabilized metal nanoparticles is then formed 310, for example, by filtering away at least a portion of the solvent. Meanwhile at least one of a polyvinyl alcohol derivative is added 311 with a second solvent. The wet cake comprising the stabilized metal nanoparticles is not actively dried prior to being added 321 with the second solvent containing the polyvinyl alcohol derivative.

Metal Salt

In some embodiments the metal salt used in preparing the metal nanoparticles can be a silver salt selected from the group consisting of silver acetate, silver trifluoroacetate, silver halide, silver sulfate, silver nitrate, silver hydrocarbylsulfonate, and a mixture of two or more thereof. The silver salt can be silver acetate in certain embodiments.

Silver Nanoparticles

The term "nano" as used in "silver nanoparticles" refers to, for example, a particle size of less than about 1,000 nm, such as, for example, from about 0.5 nm to about 1,000 nm, for example, from about 1 nm to about 500 nm, from about 1 nm to about 100 nm, from about 1 nm to about 25 nm or from about 1 to about 10 nm. The particle size refers to the average diameter of the metal particles, as determined by TEM (transmission electron microscopy) or other suitable method. Generally, a plurality of particle sizes may exist in the silver nanoparticles obtained from the processes described herein. In embodiments, the existence of different sized silver nanoparticles is acceptable.

The silver nanoparticles may have a stability (that is, the time period where there is minimal precipitation or aggregation of the silver nanoparticles in the ink composition) of, for example, at least from about 5 days to about 1 month, from about 1 week to about 6 months, from about 1 week to over 1 year. The stability can be monitored using a variety of methods, for example, a dynamic light scattering method that probes the particle size, a simple filtration method using a determined filter pore size, for example 1 micron, to evaluate the solid on the filter.

Additional metal nanoparticles in place of, or along with the, silver nanoparticles may also be used, such as, for example, Al, Au, Pt, Pd, Cu, Co, Cr, In, Ni, or mixtures thereof particularly the transition metals, for example, Au, Pt, Pd, Cu, Cr, Ni, or mixtures thereof. Furthermore, the ink composition may also include a silver nanoparticle composite or a metal nanoparticle composite, such as, for example, Au—Ag, Ag—Cu, Ag—Ni, Au—Cu, Au—Ni, Au—Ag—Cu, Au—Ag—Pd or mixtures thereof. The composites may also include non-metals, such as, for example, Si, C, Ge or mixtures thereof. The various components of the composites may be present in an amount ranging for example from about 0.01% to about 99.9% by weight, particularly from about 10% to about 90% by weight.

The weight percentage of the silver nanoparticles in the ink composition may be from, for example, about 10 weight percent to about 80 weight percent, from about 30 weight percent to about 60 weight percent or from about 40 weight percent to about 70 weight percent.

Stabilizer

The ink composition described herein contains a stabilizer that is associated with the surface of the silver nanoparticles and is not removed until the annealing of the silver nanoparticles during formation of metal features on a substrate. The stabilizer may be organic.

In embodiments, the stabilizer is physically or chemically associated with the surface of the silver nanoparticles. In this way, the silver nanoparticles have the stabilizer thereon outside of a liquid solution. That is, the nanoparticles with the stabilizer thereon may be isolated and recovered from a reaction mixture solution used in forming the nanoparticles and stabilizer complex. The stabilized nanoparticles may thus be subsequently readily and homogeneously dispersed in a solvent for forming a printable liquid.

As used herein, the phrase "physically or chemically associated" between the silver nanoparticles and the stabilizer may be a chemical bond and/or other physical attachment. The chemical bond may take the form of, for example, covalent bonding, hydrogen bonding, coordination complex bonding, or ionic bonding, or a mixture of different chemical bonds. The physical attachment may take the form of, for example, van der Waals' forces or dipole-dipole interaction, or a mixture of different physical attachments.

The term "organic" in "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. Examples of the organoamine are an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

Examples of other organic stabilizers include, for example, thiol and its derivatives, —OC=SH (xanthic acid), polyethylene glycols, polyvinylpyridine, polyninylpyrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, and O-dodecylxanthic acid. Organic stabilizers containing a pyridine derivative (for example, dodecyl pyridine) and/or organophosphine that can stabilize metal nanoparticles may also be used as a potential stabilizer.

Further examples of stabilized silver nanoparticles may include: the carboxylic acid-organoamine complex stabilized silver nanoparticles, described in U.S. Patent Application Pub. No. 2009/0148600; the carboxylic acid stabilizer silver nanoparticles described in U.S. Patent App. Pub. No. 2007/0099357 A1, and the thermally removable stabilizer and the UV decomposable stabilizers described in U.S. Patent Application Pub. No. 2009/0181183, each of which is incorporated by reference herein in its entirety.

The extent of the coverage of stabilizer on the surface of the silver nanoparticles may vary, for example, from partial to full coverage depending on the capability of the stabilizer to stabilize the silver nanoparticles. Of course, there is variability as well in the extent of coverage of the stabilizer among the individual silver nanoparticles.

The weight percentage of the organic stabilizer in the silver nanoparticle (including only the silver nanoparticle and the stabilizer, excluding the solvent) may be from, for example, about 3 weight percent to about 80 weight percent, from about 5 weight percent to about 60 weight percent, from about 10 weight percent to about 50 weight percent, or from about 10 weight percent to about 30 weight percent.

In embodiments, the silver nanoparticle is an organoamine stabilized silver nanoparticle. The weight percentage of silver in the silver nanoparticle (silver and stabilizer only) is from about 60% to about 95% or from about 70% to about 90%. The weight percentage of the silver nanoparticles in the silver nanoparticle solution (including the solvent) is from about 20% to about 80%, including from about 30% to about 80%. The weight percentage of the silver nanoparticles in the silver ink composition may be from about 10% to about 80%, from about 30% to about 70% and from about 40% to about 60%.

Solvent

Metal nanoparticles, such as silver nanoparticles, can be formed in a first solvent comprising methanol and decalin. The metal nanoparticles can be transported as a wet cake in which methanol and/or decalin have not been removed in an active drying step. The nanoparticles can then be dispersed in a second solvent, such as fresh decalin, or in a second solvent that comprises mostly decalin, in a process for forming a conductive ink. Depending on the application in which the conductive ink is to be utilized, other additives like adhesion promoter additives such as polyvinyl deratives and/or viscosity adjusters can be added with the second solvent.

The solvents should facilitate the dispersion of the stabilized silver nanoparticles and the polyvinyl alcohol derivative resins. Examples of the solvent may include, for example, aromatic hydrocarbons such as benzene, toluene, xylene, ethylbenzene, decalin and tetralin, an alkane, alkene or an alcohol having from about 10 to about 18 carbon atoms such as, undecane, dodecane, tridecane, tetradecane, hexadecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; an alcohol, such as for example, terpineol (.alpha.-terpineol), .beta.-terpineol, geraniol, cineol, cedral, linalool, 4-terpineol, lavandulol, citronellol, nerol, methol, borneol, hexanol heptanol, cyclohexanol, 3,7-dimethylocta-2,6-dien-1ol, 2-(2-propyl)-5-methyl-cyclohexane-1-ol, and the like; isoparaffinc hydrocarbons, such as, for example, isodecane, isododecane, and commercially available mixtures of isoparaffins such as ISOPAR® E, ISOPAR G, ISOPAR H, ISOPAR L and ISOPAR M (all the above-mentioned manufactured by Exxon Chemical Company), SHELLSOL (made by Shell Chemical Company), SOLTROL (made by Philips Oil Co., Ltd.), BEGASOL (made by Mobil Petroleum Co., Inc.) and IP Solvent 2835 (made by Idemitsu Petrochemical Co., Ltd.); naphthenic oils; tetrahydrofuran; chlorobenzene; dichlorobenzene; trichlorobenzene; nitrobenzene; cyanobenzene; acetonitrile; dichloromethane; N,N-dimethylformamide (DMF); and mixtures thereof. One, two, three or more solvents may be used.

In embodiments where two or more solvents are used, each solvent may be present at any suitable volume ratio or weight ratio such as for example from about 99 (first solvent):1 (second solvent) to about 1 (first solvent):99 (second solvent), including the volume ratio or weight molar ratio from about 80 (first solvent):20 (second solvent) to about 20 (first solvent):80 (second solvent). For example, the solvent may a mixture comprised of a solvent selected from the group consisting of terpineol, hexanol, heptanol, cyclohexanol, 3,7-dimethylocta-2,6-dien-1ol, 2-(2-propyl)-5-methyl-cyclohexane-1-ol, and the like, and at least one hydrocarbon solvent selected from the group consisting of decalin, hexadecane, hexadecene, and 1,2,4-trimethylbenzene.

Solvent may be present in the silver ink composition in an amount, relative to the amount of silver content, of at least 10 weight percent of the composition, such as for example from about 10 weight percent to about 90 weight percent, from about 20 weight percent to about 80 weight percent, from about 30 weight percent to about 70 weight percent and from about 40 weight percent to about 60 weight percent of the composition relative to the amount of silver content in the ink.

Polyvinyl Alcohol Derivative Resins

The silver ink composition further comprises at least one polyvinyl alcohol derivative resin. The polyvinyl alcohol derivative resin acts as an adhesion promoter to facilitate its adhesion to a wide variety of substrates and also increases the stability of ink composition, such as by extending the shelf life of the ink composition. Furthermore, the polyvinyl alcohol derivative resin must be compatible with jettability and stability requirements for the ink formation.

In embodiments, the polyvinyl alcohol derivative resin may be represented by formula (1)

wherein $R_1$ is a chemical bond, such as a covalent chemical bond, or a divalent hydrocarbon linkage having from about 1 to about 20 carbons, from about 1 to about 15 carbon atoms, from about 4 to about 12 carbon atoms, from about 1 to about 10 carbon atoms, from about 1 to about 8 carbon atoms or from about 1 to about 4 carbon atoms, for example, methyl, ethyl and the like; $R_2$ and $R_3$ are independently a substituted or unsubstituted alkyl group, such as a methyl, ethyl, propyl, butyl, pentyl, hexyl and heptyl groups, an aromatic group or a substituted aromatic group having from about 1 to about 20 carbon atoms, from about 1 to about 15 carbon atoms, from about 4 to about 12 carbon atoms, from about 1 to about 10 carbon atoms, from about 1 to about 8 carbon atoms or from about 1 to about 4 carbon atoms; x, y and z represent the proportion of the corresponding repeat units respectively expressed as a weight percent, wherein each repeat unit is randomly distributed along polymer chain, and the sum of x, y and z is about 100 weight percent; x is independently from about 3 weight percent to about 50 weight percent, from about 5 weight percent to about 40 weight percent, from about 5 weight percent to about 25 weigh percent and from about 5 weight percent to about 15 weight percent; y is independently from about 50 weight percent to about 95 weight percent, from about 60 weight percent to about 95 weight percent, from about 75 weight percent to about 95 weight percent and from about 80 weight percent to about 85 weight percent; z is independently from 0 weight percent to about 15 weight percent, from 0 weight percent to about 10 weight percent, from 0 weight percent to about 5 weight percent and from 0 weight percent to about 3 weight percent. The polyvinyl alcohol derivative resin of Formula 1 may be derived from a polyvinyl alcohol and vinyl acetate and has a molecular weight (Mw) of from about 10,000 to about 600,000 Daltons (Da), from about 40,000 to about 300,000 Da and from about 50,000 to abut 250,000 Da. A representative composition of the polyvinyl alcohol derivative resin constitutes, on a weight basis, about 11 to 25% hydroxyl groups, calculated as polyvinyl alcohol, 0 to 2.5% acetate groups calculated as polyvinylacetate, with the balance being vinyl butyral groups.

Examples of polyvinyl alcohol derivative resins such as polyvinyl butyral resins (PVB) include those resins manufactured under the trade name MOWITAL® (Kuraray America), S-LEC™ (Sekisui Chemical Company), BUTVAR® (Solutia, Inc.), and PIOLOFORM® (Wacker Chemical Company).

The polyvinyl alcohol derivative resin may be in the form of a powder or pellet, and may be produced by the methods described in WO 2008/030907, which is incorporated by reference herein in its entirety. For example, PVB resin powder can be produced by using a vinyl alcohol-based polymer, such as polyvinyl alcohol (PVA), as a raw material and butyralizing it.

Vinyl alcohol-based polymer, such as PVA, may be produced by saponifying a polymer obtained by polymerizing a vinyl ester-based monomer. Methods for polymerizing a vinyl ester-based monomer include solution polymerization, bulk polymerization, suspension polymerization, and emulsion polymerization. For the polymerization, azo-type initiators, peroxide-type initiators, redox-type initiators, or the like can be selected appropriately as a polymerization initiator depending on the polymerization method.

As the vinyl ester-based monomer, for example, vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate, vinyl benzoate, and the like may be used.

When polymerizing the above vinyl ester-based monomer, another monomer may be copolymerized. Examples of these additional monomers may include for example, α-olefins such as ethylene, propylene, n-butene, and isobutylene; acrylic acid or salts thereof; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid or salts thereof, methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, or acrylamide derivatives such as N-methyl acrylamide, N-ethyl acrylamide, N,N-dimethyl acrylamide, diacetone acrylamide, acrylamide propane sulfonic acid and salts thereof, acrylamide propyldimethylamine and acid salts thereof as well as quaternary salts thereof, and N-methylol acrylamide and derivatives thereof, methacrylamide or methacrylamide derivatives such as N-methyl methacrylamide, N-ethyl methacrylamide, methacrylamide propane sulfonic acid and salts thereof, methacrylamide propyldimethylamine and acid salts thereof as well as quaternary salts thereof, and N-methylol methacrylamide and derivatives thereof vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, and allyl chloride; maleic acid and salts thereof as well as esters thereof and anhydrides thereof, vinylsilyl compounds such as vinyltrimethoxysilane; and isopropenyl acetate or the like, may be used. These monomers may be used at a ratio of about 5 mole % to about 90 mole % with respect to the vinyl ester-based monomer.

A vinyl alcohol-based polymer obtained by saponifying a polymer obtained by polymerizing a vinyl ester-based monomer includes a vinyl alcohol unit and a vinyl ester unit derived from the above vinyl ester-based monomer, although the content ratio for each unit is different depending on the degree of the saponification. For example, when using vinyl acetate as a vinyl ester-based monomer, the vinyl alcohol-based polymer obtained by the above production method includes a vinyl alcohol unit and a vinyl acetate unit.

Butyralization of a vinyl alcohol-based polymer may be carried out by any known method. For example, a vinyl alcohol-based polymer and butyl aldehyde may be mixed in the presence of an acid catalyst. The acid catalyst may be an organic acid or inorganic acid. Examples of the acid catalyst include acetic acid, p-toluenesulfonic acid, nitric acid, sulfuric acid, and hydrochloric acid.

Although a PVB resin may be obtained by butyralizing a vinyl alcohol-based polymer with n-butyl aldehyde, aldehydes having a carbon number of 2 to 6 other than butyl aldehyde, such as acetaldehyde, propionaldehyde, n-hexylaldehyde, and 2-ethylbutylaldehyde, can be used in combination.

The polyvinyl alcohol derivative resin may be present in the ink composition in an amount of less than about 5 weight percent of the composition, such as for example from about 0.1 weight percent to about 5 weight percent, from about 0.1 weight percent to about 4 weight percent, from about 0.1 weight percent to about 3 weight percent and from about 0.1 weight percent to about 2 weight percent of the composition.

The ink composition may have a viscosity of from about 2 cps to about 200 cps, from about 3 cps to about 100 cps, from about 4 cps to about 50 cps and from about 5 cps to about 20 cps.

The silver ink composition comprised may be produced by stabilizing the silvers nanoparticles, adding the stabilized silver nanoparticles to the solvent containing polyvinyl alcohol derivatives such as PVB resin, and depositing the ink composition on a substrate. The composition may be used to print and form metal features on a substrate.

Method of Printing and Thin-Film Substrate

The fabrication of conductive features, such as an electrically conductive element, from the silver nanoparticle composition can be carried out by depositing the composition on a substrate using any suitable liquid deposition technique at any suitable time prior to or subsequent to the formation of other optional layer or layers on the substrate. Thus, liquid deposition of the composition on the substrate can occur either on a substrate or on a substrate already containing layered material, for example, a semiconductor layer and/or an insulating layer.

The phrase "liquid deposition technique" refers to, for example, deposition of a composition using a liquid process such as printing or liquid coating, where the liquid is a homogeneous or heterogeneous dispersion of the silver nanoparticles in the solvent. The silver nanoparticle composition may be referred to as an ink when it is used in an inkjet printer or similar printing device to be deposited on a substrate. Examples of liquid coating processes may include, for example, spin coating, blade coating, rod coating, dip coating, and the like. Examples of printing techniques may include, for example, lithography or offset printing, gravure, flexography, screen printing, stencil printing, inkjet printing, stamping (such as microcontact printing), and the like. Liquid deposition deposits a layer or line of the composition having a thickness ranging from about 5 nanometers to about 5 millimeters, such as from about 10 nanometers to about 1000 micrometers on the substrate. The deposited silver nanoparticle composition at this stage may or may not exhibit appreciable electrical conductivity.

The silver nanoparticles can be spin-coated from the silver nanoparticle ink composition, for example, for about 10 seconds to about 1000 seconds, for about 50 seconds to about 500 seconds or from about 100 seconds to about 150 seconds, onto a substrate at a speed, for example, from about 100 revolutions per minute ("rpm") to about 5000 rpm, from about 500 rpm to about 3000 rpm and from about 500 rpm to about 2000 rpm.

The substrate upon which the silver metal features are deposited may be any suitable substrate, including, for example, silicon, glass plate, plastic film, sheet, fabric, or paper. For structurally flexible devices, plastic substrates, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

Heating the deposited composition at a temperature of, for example, at or below about 200° C., such as, for example, from about 80° C. to about 200° C., from about 80° C. to about 180° C., from about 80° C. to about 160° C., from about 100° C. to about 140° C. and from about 100° C. to about 120° C. induces the silver nanoparticles to "anneal" and thus forms an electrically conductive layer, which is suitable for use as an electrically conductive element in electronic devices. The heating temperature is one that does not cause adverse changes in the properties of previously deposited layer(s) or the substrate (whether single layer substrate or multilayer substrate). Also, the low heating temperatures described above allow the use of low cost plastic substrates, which have an annealing temperature below 200° C.

The heating can be performed for a time ranging from, for example, 0.01 second to about 10 hours and from about 10 seconds to 1 hour. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the silver nanoparticles and/or (2) remove the optional stabilizer from the silver nanoparticles. Examples of heating techniques may include thermal heating (for example, a hot plate, an oven, and a burner), infra-red ("IR") radiation, a laser beam, flash light, microwave radiation, or UV radiation, or a combination thereof.

Heating produces a number of effects. Prior to heating, the layer of the deposited silver nanoparticles may be electrically insulating or with very low electrical conductivity, but heating results in an electrically conductive layer composed of annealed silver nanoparticles, which increases the conductivity. In embodiments, the annealed silver nanoparticles may be coalesced or partially coalesced silver nanoparticles. In embodiments, it may be possible that in the annealed silver nanoparticles, the silver nanoparticles achieve sufficient particle-to-particle contact to form the electrically conductive layer without coalescence.

In embodiments, after heating, the resulting electrically conductive line that has a thickness ranging, for example, from about 5 nanometers to about 5 microns, from about 10 nanometers to about 2 microns, from about 50 nanometers to about 300 nanometers microns, from about 50 nanometers to about 200 nanometers and from about 50 nanometers to about 150 nanometers.

The conductivity of the resulting metal element produced by heating the deposited silver nanoparticle composition is, for example, more than about 100 Siemens/centimeter ("S/cm"), more than about 1000 S/cm, more than about 2,000 S/cm, more than about 5,000 S/cm, or more than about 10,000 S/cm or more than 50,000 S/cm.

The resulting elements can be used as electrodes, conductive pads, interconnect, conductive lines, conductive tracks, and the like in electronic devices such as thin film transistors, organic light emitting diodes, RFID (radio frequency identification) tags, photovoltaic, displays, printed antenna and other electronic devices which require conductive elements or components.

In yet other embodiments, there is provided a thin film transistor comprising: (a) an insulating layer; (b) a gate electrode; (c) a semiconductor layer; (d) a source electrode; and (e) a drain electrode, wherein the insulating layer, the gate electrode, the semiconductor layer, the source electrode, and the drain electrode are in any sequence as long as the gate electrode and the semiconductor layer both contact the insulating layer, and the source electrode and the drain electrode both contact the semiconductor layer, and wherein at least one of the source electrode, the drain electrode, and the gate electrode are formed by: providing a silver ink composition a silver nanoparticle particle solution including silver nanoparticles and a stabilizer, a solvent and a polyvinyl alcohol derivative resin of Formula (1)

wherein $R_1$ is a chemical bond or a divalent hydrocarbon linkage having from about 1 to about 20 carbons; $R_2$ and $R_3$ are independently an alkyl, an aromatic or substituted aromatic group having from about 1 to about 20 carbon atoms; x, y and z represent the proportion of the corresponding repeat units respectively expressed as a weight percent, wherein each repeat unit is randomly distributed along polymer chain, and the sum of x, y and z is about 100 weight percent, wherein polyvinyl alcohol derivative resin is present in an amount of from 0.1 to about 5 weight percent of the composition, and wherein the viscosity of the silver ink composition is from about 2 cps to about 200 cps, depositing the silver ink composition onto the substrate to form deposited features, and heating the deposited features on the substrate to a temperature from about 80° C. to about 160° C. to form conductive silver features on the substrate.

A gate electrode, a source electrode, and a drain electrode may thus be fabricated by embodiments herein. The thickness of the gate electrode layer ranges for example from about 10 nm to about 2000 nm. Typical thicknesses of source and drain electrodes are, for example, from about 40 nm to about 1 micrometer with the more specific thickness being about 60 nm to about 400 nm.

The insulating layer generally may be an inorganic material film or an organic polymer film. Examples of inorganic materials suitable as the insulating layer may include, for example, silicon oxide, silicon nitride, aluminum oxide, barium titanate, barium zirconium titanate and the like. Illustrative examples of organic polymers for the insulating layer may include, for example, polyesters, polycarbonates, poly(vinyl phenol), polyimides, polystyrene, poly(methacrylate)s, poly(acrylate)s, epoxy resin and the like. The thickness of the insulating layer is, for example from about 10 nm to about 500 nm depending on the dielectric constant of the dielectric material used. An exemplary thickness of the insulating layer is from about 100 nm to about 500 nm. The insulating layer may have a conductivity that is, for example, less than about $10^{-12}$ S/cm.

Situated, for example, between and in contact with the insulating layer and the source/drain electrodes is the semiconductor layer wherein the thickness of the semiconductor layer is generally, for example, about 10 nm to about 1 micrometer, or about 40 to about 100 nm. Any semiconductor material may be used to form this layer. Exemplary semiconductor materials include regioregular polythiophene, oligothiophene, pentacene, and the semiconductor polymers disclosed in U.S. Publication No. 2003/0160230 A1; U.S. Publication No. 2003/0160234 A1; U.S. Publication No. 2003/0136958 A1; the disclosures of which are totally incorporated herein by reference. Any suitable technique may be used to form the semiconductor layer. One such method is to apply a vacuum of from about $10^{-5}$ torr to about $10^{-7}$ torr to a chamber containing a substrate and a source vessel that holds the compound in powdered form, and heat the vessel until the compound sublimes onto the substrate. The semiconductor layer can also generally be fabricated by solution processes such as spin coating, casting, screen printing, stamping, or jet printing of a solution or dispersion of the semiconductor.

The insulating layer, the gate electrode, the semiconductor layer, the source electrode, and the drain electrode are formed in any sequence, particularly where in embodiments the gate electrode and the semiconductor layer both contact the insulating layer, and the source electrode and the drain electrode both contact the semiconductor layer. The phrase "in any sequence" includes sequential and simultaneous formation. For example, the source electrode and the drain electrode can be formed simultaneously or sequentially. The composition, fabrication, and operation of thin film transistors are described in U.S. Pat. No. 6,107,117, the disclosure of which is totally incorporated herein by reference.

In embodiments, at least one of the gate, source or drain electrode in a thin-film transistor is formed by using a method described herein to form conductive features on a substrate, providing a composition containing silver nanoparticles stabilized by an organoamine compound; depositing the organoamine-stabilized silver nanoparticle onto the substrate, wherein during the deposition or following the deposition of the organoamine-stabilized silver nanoparticle onto the substrate, and removing the stabilizer, at a temperature below about 200° C., to form conductive features on the substrate.

Embodiments herein are further illustrated by way of the following examples. All percentages and parts are by weight unless otherwise indicated. Room temperature refers to a temperature ranging for example from about 20° C. to about 25° C.

EXAMPLES

Comparative Examples A-H

The following comparative examples provide procedures for forming dried stabilized silver nanoparticles, and using the dried stabilized silver nanoparticles to form nanoparticles-based inks.

Comparative Example A

Preparation of Dried Stabilized Silver Nanoparticles

The jacket to a 6 L reactor was set to 50° C. When the temperature on the jacket reached approximately 40° C., 724.4 g decalin was charged into the reactor, followed by 2396.5 g dodecylamine, 176.50 g phenylhydrazine and 176.5 g of methanol. Once all the liquid raw materials were charged, the reactor was cooled down to 35° C. before silver acetate addition. 539.4 g silver acetate was added to the reaction mixture over 2 hours. The reactor temperature is increased to 40° C. to start precipitation. Methanol (2133.70 g) was added to the reactor over 25 minutes to isolate the silver nanoparticles. After vacuum filtration to remove the mother liquor, the product was re-slurry washed with 534 g of methanol for 30 minutes followed by vacuum filtration to remove excess methanol. The silver content of the final product (by ASH) is 87%. The final product was actively dried overnight (at around 30° C.) under vacuum.

Comparative Example B

Preparation of Ink Composition from Dried Stabilized Silver Nanoparticles

A silver nanoparticle ink was prepared using the actively dried silver nanoparticles of Comparative Example A. Ten grams of silver nanoparticle ink with 40 weight percent solid content in decalin was prepared by adding 6 grams of decalin to 4 grams of the silver nanoparticles in a glass bottle. The mixture was soaked for 24 hours and then stirred for 24 hours at room temperature. The resulting mixture was filtered using a plastic Acrodisc 25 mm syringe filter with a 1 µm glass-fiber membrane, and yielded 9.65 grams of a conducting ink with a high filtration yield of 96.5 weight percent. The prepared conducting ink contained 36.4 weight percent silver, which was determined by heating a small amount (0.5 g-1.0 g) of the ink at a high temperature (e.g., between 250° C. and 260° C.) to remove all of the stabilizer from the surface of the silver nanoparticles. The prepared ink was highly conductive with a conductivity of $3.30 \times 10^4$ S/cm, which was measured using a Keithley Model 236 Source-Measure Unit with 4-probes.

Comparative Example C

Preparation of Dried Stabilized Silver Nanoparticles

Stabilized silver nanoparticles were prepared by adding 20 grams of silver acetate to a heated dodecylamine (111 g) in a reaction flask at about 60-65° C. The mixture was then stirred until the silver acetate was completely dissolved. Subsequently, the temperature of mixture was reduced to about 55° C. and about 7.12 grams of phenylhydrazine was added to the mixture to form a resulting mixture, which was stirred for about one hour at 55° C. Next, the temperature of resulting mixture was reduced to about 40-45° C. and methanol about 400 ml were added to the resulting mixture and stirred for about 10 minutes. The product was collected by filtration, rinsed with methanol and then dried in a vacuum oven at room temperature overnight. The final product contains about 81 weight percent silver and about 19 weight percent dodecylamine as the stabilizer.

Comparative Example D

Preparation of Ink Composition From Dried Stabilized Silver Nanoparticles

An ink composition was prepared by adding 0.2 grams of a 2 weight percent solution of polyvinyl butyral resin (PVB) in terpineol (polyvinyl alcohol content: 11.5 to 13.5 by weight percent; polyvinyl acetate content: 0-2.5 by weight percent; polyvinyl butyral content: about 88 by weight with molecular weight from about 90,000 to 120,000) to a mixture of 0.4 grams of dried dodecylamine stabilized silver nanoparticles such as the dodecylamine stabilized silver nanoparticles of Comparative Example C, 0.4 grams of decalin, and 0.06 grams of octadecene. The ink composition, containing about 37.4 weight percent silver nanoparticles and about 1 weight percent PVB resin (relative to the amount of silver nanoparticles), was mixed well by vigorous shaking using a Minishaker (IKA MS3) and then filtered with 0.45 μm Sigma Aldrich ACRODISC syringe filter. The filtered ink composition was printed on a glass slide using a Dimatix DMP-2800 inkjet printer equipped with a 10 mL cartridge to form featured lines of silver nanoparticles. The featured lines of silver nanoparticles were heated in an oven at a temperature from about 110 to 115° C. for about 10 minutes to anneal the silver nanoparticles, and form featured conductive lines with an average thickness of approximately 186 nm and an average width of 57 μm. The average conductivity of the annealed silver lines was $8 \times 10^4$ S/cm, as measured by KEITHLEY Interactive Test Environment (two terminal resistor I-V method).

Comparative Example E

Preparation of Dried Stabilized Silver Nanoparticles

Dodecylamine (88.91 g) (as a stabilizer) was heated to 40° C. in a mixture of decalin (30 mL) and methanol (6 mL) in a reaction flask under argon atmosphere until it dissolved. The temperature of the stabilizer (e.g., dodecylamine) solution was reduced to about 30° C. Phenylhydrazine (6.54 g) (as a reducing agent) was added to the cooled stabilizer solution with stirring. Silver acetate (20 g) was then gradually added over 2 hours while the reaction mixture was maintained at a temperature range between 30° C. and 35° C. The color of the reaction mixture changed from clear to dark brown as the silver acetate was added and indicated the formation of silver nanoparticles. After complete addition of the silver acetate, the reaction mixture was heated to 40° C. and stirred at this temperature for one hour.

Crude product was precipitated by adding methanol (100 mL) to the reaction mixture with stirring and the precipitated crude product was collected by filtration. The collected crude product was transferred to a glass beaker and stirred in methanol (50 mL). The final product was collected by filtration and dried in a vacuum oven at room temperature (about 25° C.) for 24 hours, and yielded 13.11 g of dark blue colored silver nanoparticles. The silver content of the final product was about 87.6 weight percent, as measured by ash technique.

Comparative Example F

Preparation of Ink Composition From Dried Stabilized Silver Nanoparticles

A silver nanoparticle ink was prepared from the silver nanoparticles of comparative example E having a silver content of about 87.6 weight percent. Five grams of a silver nanoparticle ink with a 40 weight percent solids content in decalin was prepared as follows: 3 grams of decalin was added to 2 grams of the stabilized silver nanoparticles in a small glass vial and the small glass vial was then gently rolled at room temperature for about 2 hours. The resulting mixture was filtered using a plastic Acrodisc 25 mm syringe filter with a 1 μm glass-fiber membrane and yielded 4.76 grams of a conducting ink with a high filtration yield of about 95 weight percent. The prepared conducting ink contained 35.8 weight percent silver, which was determined by heating a small amount (0.5 g-1.0 g) of the ink at a high temperature (e.g., between 250° C. and 260° C.) to remove all of the stabilizer from the surface of the silver nanoparticles.

The ink prepared as described above was highly conductive. Its conductivity was tested with a spin-coated thin film on a glass substrate from a diluted ink (~20 weight percent). Additional solvent (decalin) was used to dilute the ink prepared as discussed above and a spin-coated thin film was prepared using the diluted ink. The spin-coated film was annealed at 120° C. for about 15 minutes on a hot plate, and yielded a highly conductive silver layer. The thickness of the annealed film was about 92 nm and the conductivity was $3.7 \times 10^4$ S/cm, which was measured using a Keithley Model 236 Source-Measure Unit with 4-probes.

Comparative Example G

Preparation of Ink Composition for Coating Application From Dried Stabilized Silver Nanoparticles Dried silver nano-particles (40 g) such as dried nanoparticles of Examples A, C or E, along with 60 g of decalin are placed in a 250-ml plastic bottle. Glass beads (26 g of 6 mm diameter) are added to the bottle. The bottle is purged with nitrogen and sealed tightly. On a ball mill machine, the content is milled for 3 hrs at 160-165 rpm. The ink is then filtered through a 1 μm pore size filter using nitrogen pressure.

Comparative Example H

Preparation of Ink Composition for Inkjet Application From Dried Stabilized Silver Nanoparticles In a 250-ml plastic bottle, 40 g of dried silver nano-particles along with 40 g of decalin are placed. 26 g of 6 mm (in diameter) glass beads are added to the bottle. The bottle is purged with nitrogen and sealed tightly. On a ball mill machine, the content is milled for 3 hrs at 160-165 rpm. However, after 2.5 hrs 20 g of dicyclohexyl is added to the mixture and it is continued milling. The ink is then filtered through a 1 μm pore size filter using nitrogen pressure.

Working Examples 1A-1B, 2A-2C, 3A-3C, and 4A-4C

The following working examples provide procedures for forming stabilized silver nanoparticles in a wet cake, and using the wet cake of stabilized silver nanoparticles to form nanoparticles-based inks.

Working Example 1A

Preparation of Silver Nanoparticle Wet Cake

A silver nanoparticle wet cake was prepared by adding 20 grams of silver acetate to a heated solution of decalin (27 g), methanol (4 g) and dodecylamine (66 g) in a reaction flask at about 60-65° C. The mixture was then stirred until the silver acetate was completely dissolved. Subsequently, the temperature of mixture was reduced to about 55° C. and about 6.5 grams of phenylhydrazine was added to the mixture to form a resulting mixture, which was stirred for about one hour at 55° C. Next, the temperature of resulting mixture was reduced to about 40-45° C. and about 400 ml methanol was added to the resulting mixture, stirring for about 10 minutes. The product was collected by filtration and rinsed with methanol.

Working Example 1B Preparation of Ink from Silver Nanoparticle Wet Cake of Working Example 1A Volatile content in the wet cake, such as that prepared in Working Example 1A, can be determined by vacuum drying a small sample of the wet cake. The ratio between the difference of the original weight and the dried weight divided by the original weight provides the volatile content. Based on the volatile content, an appropriate mass of silver nanoparticles wet cake can be measured to make about 30-40 wt % silver content in the final ink. Accordingly, an ink composition was prepared by adding 0.2 grams of a 2 weight percent solution of polyvinyl butyral resin (PVB) in terpineol (polyvinyl alcohol content: 11.5 to 13.5 by weight percent; polyvinyl acetate content: 0-2.5 by weight percent; polyvinyl butyral content: about 88 by weight with molecular weight from about 90,000 to 120,000) to a mixture of 0.4 grams of dodecylamine stabilized silver nanoparticles in a wet cake, such as the wet cake of dodecylamine stabilized silver nanoparticles of Working Example 1A, 0.4 grams of decalin, and 0.06 grams of octadecene. The ink composition, containing about 37.4 weight percent silver nanoparticles and about 1 weight percent PVB resin (relative to the amount of silver nanoparticles), was mixed well by vigorous shaking using a Minishaker (IKA MS3) and then filtered with 0.45 μm Sigma Aldrich ACRODISC syringe filter.

Working Example 2A

Preparation of Silver Nanoparticle Wet Cake

The jacket to a 6 L reactor was set to 50° C. When the temperature on the jacket reached approximately 40° C., 724.4 g decalin was charged into the reactor, followed by 2396.5 g dodecylamine, 176.50 g phenylhydrazine and 176.5 g of methanol. Once all the liquid raw materials was charged, the reactor was cooled down to 35° C. before silver acetate addition. 539.4 g silver acetate was then added to the reaction mixture over 2 hours. The reactor temperature was increased to 40° C. to start precipitation. Methanol (2133.70 g) was added to the reactor over 25 minutes to isolate the silver nano-particles. After vacuum filtration to remove the mother liquor, the product was re-slurry washed with 534 g of methanol for 30 minutes, followed by vacuum filtration to remove excess methanol. The product was not actively dried and was kept as a wet cake form. The silver content of the final product (by ASH) was 87%.

Working Example 2B

Preparation of Ink from Silver Nanoparticle Wet Cake of Working Example 2A

A wetcake (46 g) of silver nano-particles, such as the wet cake formed in Working Example 2A, along with 60 g decalin are placed in a 125-ml plastic bottle. The bottle is tightly sealed with a cap pierced with two needles to provide a nitrogen inlet and outlet for a nitrogen purge. A nitrogen purge is set at 2SCFH for 24 hrs. The content is weighed again and approximately 6 g weight loss is observed due to volatiles removed from the wet cake during the nitrogen purge. 27 g of 6 mm diameter size glass beads are added to the bottle. The bottle is placed on the roll mill for 2 hrs at 165 rpm. Prior to milling, the bottle is purged with nitrogen and sealed tightly to avoid any air exposure. After 2 hrs, the ink is filtered with 1 μm Gortex filter membrane and nitrogen pressure (filter diameter is 12 cm, and max pressure is 2.2 bar). 100.7 g of ink is recovered (Silver content by ash is 36%).

Working Example 3A

Preparation of Silver Nanoparticle Wet Cake

Dodecylamine (88.91 g) in a mixed solvent of decalin (30 mL) and methanol (6 mL) was heated up to 40° C. in a reaction flask under argon atmosphere until it dissolved. The solution was reduced to 30° C. and a then a reducing agent phenylhydrazine (6.54 g) was added to the solution with good stirring. Silver acetate (20 g) was then added gradually in duration of 2 hours at a temperature range of 30 to 35° C. The color of the reaction mixture was changed from clear to dark brownish during the addition, indicating the formation of silver nanoparticles. After the addition, the reaction mixture was heated to 40° C. and was stirred at this temperature for one hour. The crude product was precipitated by adding certain amount of MeOH (100 mL) with good stirring to form a slurry and then collected by filtration to form a wet cake. The collected solid formed as a wet cake was transferred to a glass beaker and stirred in methanol (50 mL). The silver content is 87.6 wt %, measured by ash technique.

Working Example 3B

Preparation of Ink Using Silver Nanoparticle Wet Cake

In a 2-L ceramic jar, 460 g a wet cake of silver nano-particles was added to 600 g of decalin. The jar was purged with 1 SCFH nitrogen for about 17 hrs. The jar, along with 270 g 6 mm glass beads, is placed over a roll mill. The content is milled for 4.5 hrs at 55-60 rpm speed and is filtered through 1 μm Gortex filter membrane and nitrogen pressure (filter diameter is 12 cm, and max pressure is 2.2 bar). 968.35 g of ink is recovered (Silver content by ash is 35.7%).

Table 1 shows characteristics of inks formed as described in Examples 1A and 1B, as well as an ink formed as described in the Comparative Example and characteristics of a "target" ink example.

TABLE 1

| Ink Experiment ID | Silver nanoparticles form | Ink Scale | Silver Content (by Ash) | Conductivity (S/cm) | Surface Roughness, Ra (nm) | Surface Smoothness (optical microscopy) |
|---|---|---|---|---|---|---|
| "Target" Example | | | >30% | >10,000 | <10 nm | No agglomerates |
| Comparative Example 1B | Dry | 4 g | 36% | >10,000 | <10 nm | pass |
| Comparative Example 1D | Dry | | | >10,000 | <10 nm | pass |
| Comparative Example 1F | Dry | | | >10,000 | <10 nm | pass |
| Working Example 1B | Wet Cake | 100 g | 36% | >10,000 | <10 nm | pass |
| Working Example 2B | Wet Cake | 1000 g | 35.7% | >10,000 | <10 nm | pass |
| Working Example 3B | Wet Cake | 1000 g | 35.7% | >10,000 | <10 nm | pass |

The results shown above demonstrate that inks formed from a/wet cake of silver nanoparticles results in an ink comparable to that of an ink formed from a dried batch of silver nanoparticles. Accordingly, wet cake formulations of silver nanoparticles can be used to improve the safety of processing silver nanoparticles-based inks by removing the need to use dry powder which is potentially a hazard. It has also eliminated at least one processing step, that of drying the nanoparticles after they are synthesized as in the Comparative Examples, thereby reducing process cycle time and cost.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of preparing a conductive ink formulation, the method comprising:
   dissolving a stabilizer in a first solvent;
   adding a reducing agent to the first solvent;
   adding a metal salt to the first solvent;
   forming a slurry by precipitating stabilized metal nanoparticles in the first solvent;
   forming a wet cake of the stabilized metal nanoparticles from at least a portion of the slurry, the wet cake comprising from about 8 wt % to about 25 wt % of volatiles; and
   adding the wet cake to a second solvent, the second solvent comprising at least one of a polyvinyl alcohol derivative, wherein the wet cake is not actively dried prior to being added to the second solvent.

2. The method of preparing a conductive ink formulation of claim 1, wherein the metal nanoparticles comprise at least one metal selected from the group consisting of Al, Au, Pt, Pd, Cu, Co, Cr, In, and Ni nanoparticles.

3. The method of preparing a conductive ink formulation of claim 1, wherein the wet cake added to the second solvent forms an ink composition comprising a viscosity of from about 2 cps to about 200 cps.

4. The method of preparing a conductive ink formulation of claim 1, wherein the metal nanoparticles comprise at least one selected from the group consisting of Au—Ag, Ag—Cu, Ag—Ni, Au—Cu, Au—Ni, Au—Ag—Cu, and Au—Ag—Pd metal nanoparticles composites.

5. The method of preparing a conductive ink formulation of claim 1, wherein the metal nanoparticles are not stored as a powder prior to being added to the second solvent.

6. The method of preparing a conductive ink formulation of claim 1, wherein the reducing agent comprises a phenylhydrazine.

7. The method of preparing a conductive ink formulation of claim 1, wherein the metal salt comprises a silver salt.

8. The method of preparing a conductive ink formulation of claim 1, wherein the metal salt comprises silver acetate.

9. The method of preparing a conductive ink formulation of claim 1, wherein the stabilized nanoparticles are organoamine stabilized silver nanoparticles.

10. The method of preparing a conductive ink formulation of claim 1, wherein the stabilizer comprises dodecylamine.

11. The method of preparing a conductive ink formulation of claim 1, wherein at least one of the first and the second solvent comprise a mixed solvent composition.

12. The method of preparing a conductive ink formulation of claim 1, wherein at least one of the first and the second solvent comprises a mixture comprised of a solvent selected from the group consisting of terpineol, hexanol, heptanol, cyclohexanol, 3,7-dimethylocta-2,6-dien-1ol, 2-(2-propyl)-5-methyl-cyclohexane-1-ol, and at least one hydrocarbon solvent selected from the group consisting of decalin, hexadecane, hexadecene, and 1,2,4-trimethylbenzene.

13. The method of preparing a conductive ink formulation of claim 1, wherein at least one of the first and the second solvent consists essentially of decalin and methanol.

14. The method of preparing a conductive ink formulation of claim 1, wherein the metal salt is added to the first solvent before the reducing agent is added to the first solvent.

15. The method of preparing a conductive ink formulation of claim 1, wherein the reducing agent is added to the first solvent before the metal salt is added to the first solvent.

16. A method of preparing a conductive ink formulation, comprising:
   reacting a metal salt with a reducing agent in a first solvent that contains a stabilizer to form a stabilized metal nanoparticle slurry;
   forming a wet cake of stabilized metal nanoparticles from at least a portion of the stabilized metal nanoparticle slurry, wherein the wet cake of stabilized metal nanoparticles comprises from about 8 wt % to about 25 wt % of volatiles; and
   adding the wet cake to a second solvent that contains a polyvinyl alcohol derivative,
   wherein the wet cake is not actively dried prior to being added to the second solvent.

17. The method of preparing a conductive ink formulation of claim 16 further comprising dispersing the metal nanoparticles of the metal nanoparticle wet cake in decalin.

18. The method of preparing a conductive ink formulation of claim 16, wherein the nanoparticle ink comprises from about 30 wt % to about 40 wt % silver.

19. The method of preparing a conductive ink formulation of claim 1, wherein the wet cake comprises from about 10 wt % to about 17 wt % of volatiles.

20. The method of preparing a conductive ink formulation of claim 1, wherein the wet cake comprises from about 13 wt % to about 15 wt % of volatiles.

* * * * *